(12) United States Patent
Chapman et al.

(10) Patent No.: US 9,445,425 B2
(45) Date of Patent: Sep. 13, 2016

(54) METHOD OF TRANSMISSION IN A COMMUNICATIONS NETWORK

(75) Inventors: Thomas Chapman, Stockholm (SE); Frank Frederiksen, Klarup (DK); Jani Matti Johannes Moilanen, Helsinki (FI); Jeroen Wigard, Klarup (DK)

(73) Assignee: Nokia Solutions and Networks Oy, Espoo (FI)

(*) Notice: Subject to any disclaimer, the term of this patent is extended or adjusted under 35 U.S.C. 154(b) by 85 days.

(21) Appl. No.: 14/353,907

(22) PCT Filed: Oct. 24, 2011

(86) PCT No.: PCT/EP2011/068528
§ 371 (c)(1),
(2), (4) Date: Apr. 24, 2014

(87) PCT Pub. No.: WO2013/060350
PCT Pub. Date: May 2, 2013

(65) Prior Publication Data
US 2014/0293974 A1    Oct. 2, 2014

(51) Int. Cl.
*H04W 72/12* (2009.01)
*H04W 72/04* (2009.01)
*H04W 16/14* (2009.01)

(52) U.S. Cl.
CPC ......... *H04W 72/1215* (2013.01); *H04W 16/14* (2013.01); *H04W 72/0453* (2013.01)

(58) Field of Classification Search
CPC ........... H04W 16/14; H04W 72/1215; H04W 72/0453
See application file for complete search history.

(56) References Cited

U.S. PATENT DOCUMENTS

| 2009/0196197 A1* | 8/2009 | DiGirolamo ........ H04L 12/2602 370/252 |
| 2010/0136989 A1* | 6/2010 | Westerberg ........... H04W 16/14 455/450 |
| 2010/0189045 A1* | 7/2010 | Takeshita ................ H04W 4/06 370/329 |

FOREIGN PATENT DOCUMENTS

| WO | WO2004057893 A1 | 7/2004 |
| WO | WO2008081309 A2 | 7/2008 |
| WO | WO2008088253 A1 | 7/2008 |
| WO | WO2010091713 A1 | 8/2010 |

OTHER PUBLICATIONS

Working Group C; White Paper Multi-RAT Network Architecture (Nov. 2013).*

* cited by examiner

*Primary Examiner* — Donald Mills
*Assistant Examiner* — Henry Baron
(74) *Attorney, Agent, or Firm* — Harrington & Smith

(57) ABSTRACT

A method of transmission in a communications network is provided in which data is transmitted using a first radio access technology and a second radio access technology. The method includes providing an anchor carrier associated only with the first radio access technology and another carrier shared between the first radio access technology and the second radio access technology. Transmission via the second radio access technology is muted in the shared carrier during at least one subframe of each data frame transmitted using the second radio access technology. Data is transmitted using the first radio access technology in the shared carrier only during the at least one subframe in which transmission using the second radio access technology is muted.

19 Claims, 6 Drawing Sheets

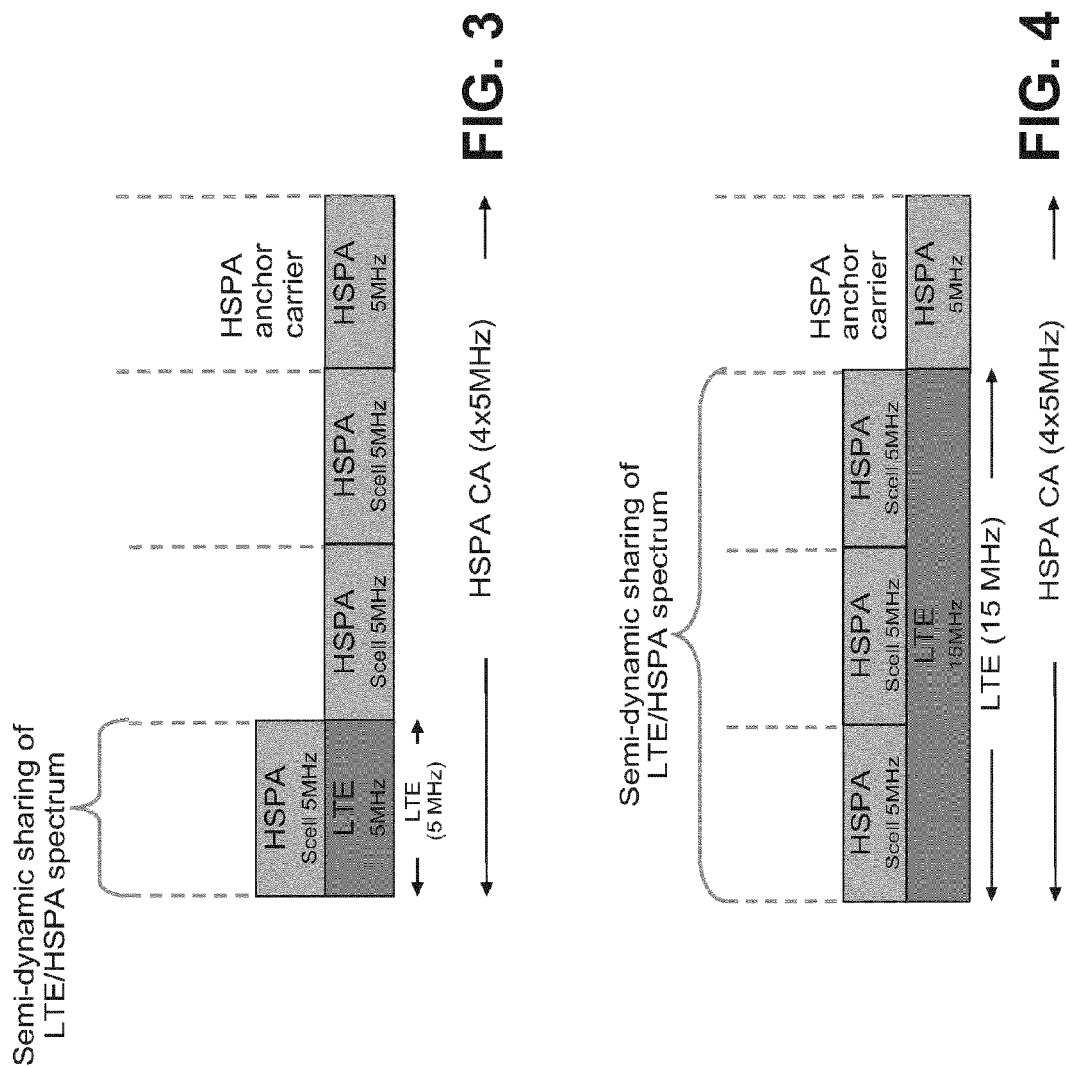

FIG. 5

METHOD OF TRANSMISSION IN A COMMUNICATIONS NETWORK

FIELD OF THE INVENTION

The invention generally relates to a method of transmission in a communications network. More particularly, the invention relates to transmission in a communications network that supports two radio access technologies such as High Speed Packet Access (HSPA) and Long Term Evolution (LTE).

BACKGROUND OF THE INVENTION

Current radio technologies such as LTE and LTE-Advanced (LTE-A) have been developed with maximum flexibility in mind in terms of deployment within the same radio technology. LTE and LTE-A are radio access technologies that provide a number of options for bandwidth utilization ranging from 1.4 MHz to 20 MHz per carrier (or per cell in 3GPP terminology) and duplexing distances (there are no tight dependencies on the duplex distance apart from being within a 100 kHz channel raster). In addition, both systems support both TDD and FDD modes of operation.

Furthermore, LTE and LTE-Advanced systems support deployment with frequency reuse 1, meaning that all neighbouring cells can use the same carrier frequency.

However, LTE and LTE-A have not been designed for ensuring a "natural migration path" for the physical layer. This means that network operators with limited spectrum resources currently used for existing radio technologies such as HSPA would need to either acquire new spectrum resources to introduce a new radio technology, or perform a "hard switch" between radio technologies. This would provide a number of current/legacy UEs with a significantly worse user experience, since part of the spectrum would be assigned to LTE, or even render them completely useless if the entire legacy spectrum were assigned to LTE.

Most modern communications networks are designed with very little or even no provision for ensuring a smooth transition path from previous/legacy systems to the new radio access technology.

The invention has been devised with the foregoing in mind.

SUMMARY OF THE INVENTION

Accordingly, the invention provides a method of transmission in a communications network in which data is transmitted using a first radio access technology based on code division multiplexing and requiring continuous transmission and a second radio access technology. The method includes providing an anchor carrier associated only with the first radio access technology for providing continuous transmission via the first radio access technology and another carrier shared between the first radio access technology and the second radio access technology, muting transmission via the second radio access technology in the shared carrier during at least one subframe of each data frame transmitted using the second radio access technology, and transmitting data using the first radio access technology in the shared carrier only during the at least one subframe in which transmission using the second radio access technology is muted. Data transmitted using code division multiplexed transmission to a user associated with the first radio technology is split into a first part having an additional time-multiplex structure and a second part having continuous transmission such that the first part contains only packet user data channels and packet user data associated signalling channels and is transmitted on the shared carrier (and on the anchor carrier) and the second part contains all dedicated channels associated with the packet user data channels, radio access related channels, broadcast and synchronization channels and is transmitted only on the anchor carrier.

In a communications network in which data is transmitted using a first radio access technology based on code division multiplexing and requiring continuous transmission and a second radio access technology, an anchor carrier is provided, which is associated only with the first radio access technology The anchor carrier provides continuous transmission via the first radio access technology. Another carrier is provided, which is shared between the first radio access technology and the second radio access technology. Transmission via the second radio access technology is muted in the shared carrier during at least one subframe of each data frame transmitted using the second radio access technology. Then data is transmitted using the first radio access technology in the shared carrier only during the time in which the second radio access technology is muted. Data transmitted using code division multiplexed transmission to a user associated with the first radio technology is split into a first part having an additional time-multiplex structure and a second part having continuous transmission such that the first part contains only packet user data channels and packet user data associated signalling channels and is transmitted on the shared carrier (and on the anchor carrier) and the second part contains channels that are required to be transmitted continuously.

Allowing transmission via the first radio access technology in the shared carrier when transmission via the second radio access technology is muted allows the spectrum to be shared in any desired proportion. In this way an available spectrum in a communications network may be shared between two different systems, namely the two radio access technologies, in a flexible and dynamic way. Although the code division multiplexed-based first radio access technology requires continuous transmission, the data transmitted using this technology may be split into two parts—one with a time division multiplex structure and one with continuous transmission so that channels requiring continuous transmission are only transmitted on the anchor carrier, whereas other channels can be transmitted on the shared carrier (and on the anchor carrier as well if required). This allows two different systems to be combined and means that a communications network may benefit from the features of both systems.

The first radio access technology may be HSPA, for example, and the second radio access technology may be LTE or LTE-A.

The number of shared carriers provided can be dependent on a number of user equipment capable of using the second radio access technology. For example, if there are only a small number of user equipment or mobile stations in the network that are able to use the second radio access technology, only one shared carrier may be needed but as the number of UEs able to use the second radio access technology increases more shared carriers can be provided. For example, in a network having a frequency spectrum of 20 MHz (4×5 MHz frequency bands or carriers) one 5 MHz band can be the anchor carrier (used only by the first radio access technology) and between one and three 5 MHz bands can be used as shared carriers capable of being used by both the first and second radio access technologies. This provides increased flexibility as to how the network capacity is shared between the two radio access technologies.

In one embodiment, data frames are transmitted from a first cell of the communications network using the first radio access technology and from a second cell of the communications network using the second radio access technology. The second cell may be adjacent to the first cell and/or may at least partially overlap the first cell.

In this case, transmission of data frames transmitted via the first radio technology may be synchronized with transmission of data frames transmitted via the second radio access technology such that a start time of transmission of a subframe of a data frame transmitted via the first radio access technology is the same as a start time of transmission of every other subframe of a data frame transmitted via the second radio access technology.

A first subframe of a data frame transmitted via the first radio access technology may be synchronized to an nth subframe of a data frame transmitted via the second radio access technology.

In one embodiment, a first subframe of a data frame transmitted via the first radio access technology is synchronized with a first subframe of a data frame transmitted via the second radio access technology and transmission via the first radio access technology takes place during a second subframe of the data frame transmitted via the first radio access technology.

In another embodiment, a first subframe of a data frame transmitted via the first radio access technology is synchronized with a second subframe of a data frame transmitted via the second radio access technology and transmission via the first radio access technology takes place during the first subframe of the data frame transmitted via the first radio access technology.

A pilot signal may be transmitted using the first radio access technology in the anchor carrier.

The invention further provides an apparatus for a communications network. The apparatus includes a first transmitter configured to transmit data using a first radio access technology based on code division multiplexing and requiring continuous transmission in an anchor carrier associated only with the first radio access technology and in another carrier shared between the first radio access technology and a second radio access technology. The anchor carrier is configured to provide continuous transmission via the first radio access technology. A second transmitter is configured to transmit data using the second radio access technology in the shared carrier and a processing unit is configured to mute transmission from the second transmitter during at least one subframe of each data frame transmitted using the second radio access technology. The first transmitter is configured to transmit data using the first radio access technology in the shared carrier only during the at least one subframe in which transmission using the second radio access technology is muted. The first transmitter is further configured to transmit data using code division multiplexed transmission to a user associated with the first radio technology, whereby the data is split into a first part having an additional time-multiplex structure and a second part having continuous transmission. The first part of the data contains only packet user data channels and packet user data associated signalling channels and is transmitted on the shared carrier (and on the anchor carrier). The second part of the data contains all dedicated channels associated with the packet user data channels, radio access related channels, broadcast and synchronization channels and is transmitted only on the anchor carrier.

Preferably, the apparatus is a base station. The base station may be a Node B configured for HSPA operation, an eNode B configured for LTE or LTE-A operation, or an eNode B configured for HSPA, LTE and LTE-A operation. Some control functionality may take place in a radio network controller (RNC) controlling the base station, although scheduling may be performed in the base station.

The invention also provides a computer program product including a program comprising software portions being arranged, when run on a processor, to perform a method of transmission in a communications network in which data is transmitted using a first radio access technology based on code division multiplexing and requiring continuous transmission and a second radio access technology. The method includes providing an anchor carrier associated only with the first radio access technology for providing continuous transmission via the first radio access technology and another carrier shared between the first radio access technology and the second radio access technology, muting transmission via the second radio access technology in the shared carrier during at least one subframe of each data frame transmitted using the second radio access technology, and transmitting data using the first radio access technology in the shared carrier only during the at least one subframe in which transmission using the second radio access technology is muted. Data transmitted using code division multiplexed transmission to a user associated with the first radio technology is split into a first part having an additional time-multiplex structure and a second part having continuous transmission. The first part contains only packet user data channels and packet user data associated signalling channels and is transmitted on the shared carrier (and on the anchor carrier if required) and the second part contains all dedicated channels associated with the packet user data channels, radio access related channels, broadcast and synchronization channels and is transmitted only on the anchor carrier.

Preferably, the computer program product includes a computer readable medium on which the software code portions are stored, and/or wherein the program is directly loadable into a memory of the processor.

The invention will now be described, by way of example only, with reference to specific embodiments and to the accompanying drawings, in which:

BRIEF DESCRIPTION OF THE DRAWINGS

FIG. 3 is a simplified schematic diagram illustrating sharing of an available frequency spectrum in a communications network between different radio access technologies;

FIG. 4 is a simplified schematic diagram illustrating sharing of an available frequency spectrum in a communications network between different radio access technologies;

FIG. 5 is a simplified schematic diagram illustrating time division multiplexed transmission patterns of two different radio access technologies in a shared carrier in a communications network;

DETAILED DESCRIPTION OF EXEMPLARY EMBODIMENTS

Figure 1:
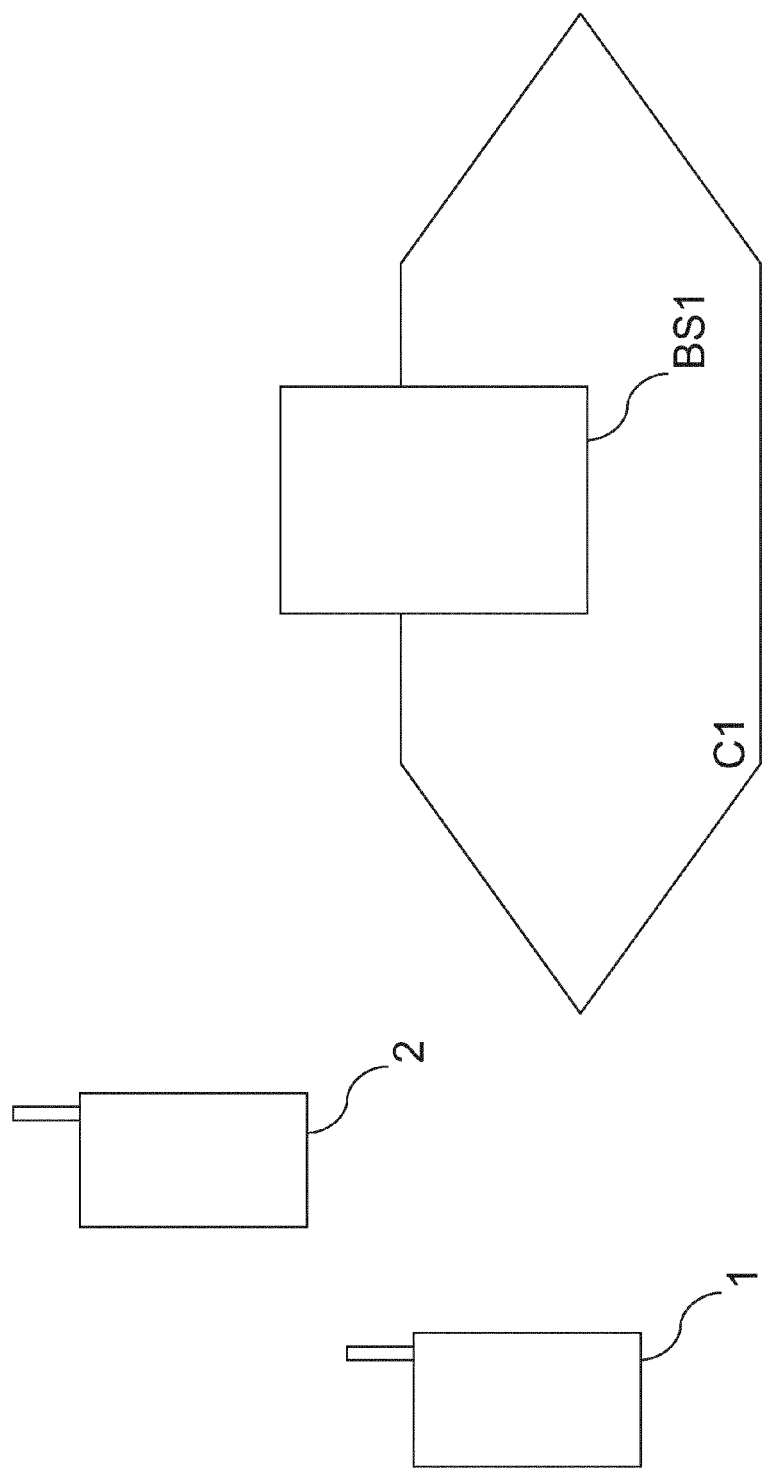
FIG. 1 is a simplified schematic diagram of a wireless communications network.

FIG. 1 shows a wireless communications network according to one embodiment of the invention. Mobile stations or user equipment (UEs) 1 and 2 may access the network over a radio interface with a base station BS1, which is located in the cell C1.

Figure 2:
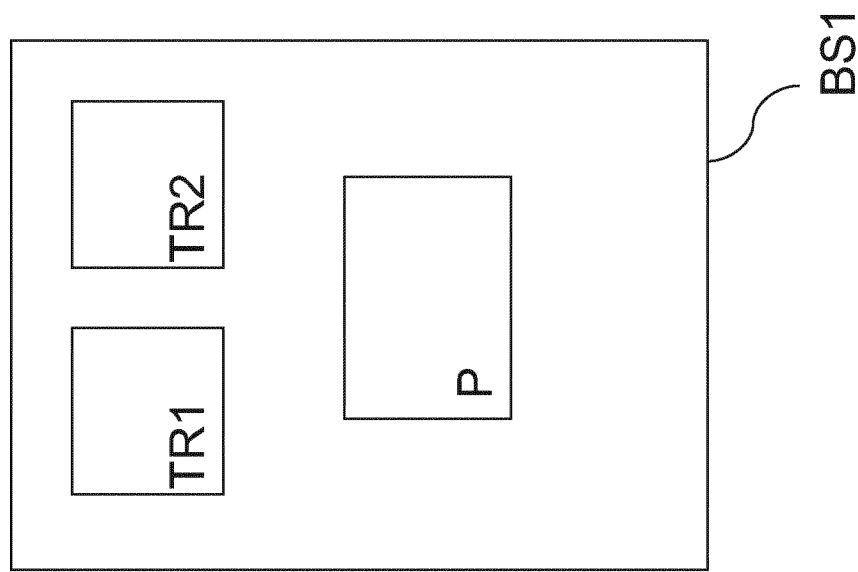
FIG. 2 is a simplified schematic diagram of a network apparatus according to an embodiment of the invention.

The base station BS1 is an enhanced Node B (e-Node B), which is capable of transmission and reception of data with the UEs 1 and 2 via both HSPA and LTE-A radio access technologies. To this end, the base station BS1 is provided with two transceiver units TR1 and TR2, as shown in FIG. 2, as well as a processor P. The transceiver TR1 is configured for the HSPA radio access technology and the transceiver TR2 is configured for the LTE-A radio access technology.

If the operator of the communications network wishes to implement a dynamic migration path from HSPA to LTE-A, the LTE part of the frequency spectrum is configured with muting patterns such that some fraction of radio spectrum can be used as a secondary spectrum for HSPA connected UEs. This means that the network operator provides an HSPA-only anchor carrier deployed beside the LTE-A carrier.

This is shown in more detail in FIGS. 3 and 4, where the network operator has a total of 20 MHz (4×5 MHz carriers) of frequency spectrum for use of 3GPP radio access technologies. One of the four carriers is a so-called anchor carrier. This anchor carrier is associated only with HSPA and does not carry any LTE channels. The anchor carrier is capable of providing continuous transmission via HSPA. The other three 5 MHz carriers are shared carriers, which may be used for both HSPA and LTE-A.

Since HSPA is based on code division multiplexing, it requires continuous transmission. If the UEs UE1 and UE2 are associated with HSPA, data transmitted to the UEs UE1 and UE2 using code division multiplexed transmission in HSPA can be split into two parts by the base station BS1. The first part of the data has an additional time-multiplex structure and contains only packet user data channels and packet user data associated signalling channels. This part of the data can be transmitted on the shared carriers, as well as on the anchor carrier. The second part of the data is transmitted continuously only on the anchor channel and contains all dedicated channels associated with the packet user data channels, radio access related channels, broadcast and synchronization channels.

If, for example, the operator has a large penetration of HSPA capable UEs and would like to start deploying LTE-A in a "soft way", rather than reserving a fixed set of resources for the LTE-A radio access technology, the operator has 4 HSPA carriers, which are operated using the quad-cell configuration in HSPA. As the operator starts bringing the LTE-A radio access technology into operation, one of the carriers will become shared between HSPA and LTE-A radio technologies, as shown in FIG. 3, with the option to carry both HSPA and LTE-A traffic between the LTE-A capable UEs and the network.

If the penetration of LTE-A capable UEs increases in the network (or in the case where the operator would like to offer higher peak data rates to the LTE-A UEs), the frequency spectrum configuration shown in FIG. 4 can be used.

Here, the fraction of the spectrum shared between HSPA and LTE-A is significantly increased (to 15 MHz) so that there are three shared 5 MHz carriers deployed beside the HSPA-only anchor carrier, and the network will be capable of carrying larger amounts of LTE-A data traffic.

Within the carrier(s) shared between the HSPA and LTE-A radio access technologies, data traffic is time multiplexed and transmission in LTE-A is muted during subframes (timeslots in HSPA) of a data frame transmitted from the base station BS1. Data is then only transmitted using HSPA in the shared carrier during the subframes in which LTE-A transmission is muted. (In HSPA a transmission time interval (TTI) is 1 ms, which is twice the length of an LTE-A subframe of 2 ms).

Figure 5:
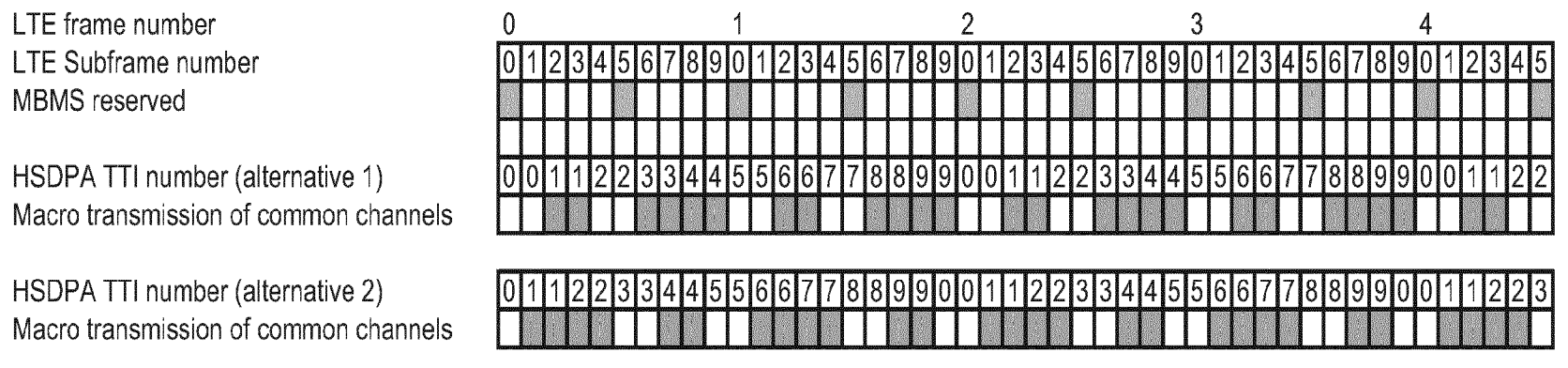

The exact approach used for this dynamic spectrum sharing between the two radio access technologies is illustrated in FIG. 5. LTE-A transmission occurs in the first and fifth subframes of every transmitted LTE data frame and is muted during other subframes. HSPA transmission may occur in only some or all of the subframes in which LTE-A transmission is muted, depending on whether or not the start of an HSPA dataframe coincides with the start of an LTE-A dataframe.

The UEs 1 and 2 are configured to perform radio related measurements at certain time instants to ensure that handover measurements and CSI measurements are happening according to desired time instants. In this embodiment, it is assumed that base station BS1 acts as a Node B (base station for HSPA) as well as an e-Node B (base station for LTE-A) so that HSPA and LTE-A transmission are already synchronized in time and the muting and transmission patterns used are coordinated between HSPA and LTE-A by algorithms run on the processor P of the base station BS1.

It is shown in FIG. 5 that two HSPA transmission patterns or configurations are possible during the time in which LTE-A transmission is muted.

The times during which HSPA transmission may take place in the shared carrier during muting of LTE-A transmission depends on when the TTI starts in HSPA. If the TTI starts at the first subframe (subframe 0) of an LTE-A dataframe, the first TTI (2 ms) of HSPA cannot be used for HSPA transmission, since the first subframe (1 ms) of LTE-A is used for transmission of LTE common channels. However, the next HSPA TTI may be used for HSPA transmission but the TTI after that cannot, since it coincides with LTE-A transmission in LTE subframe 5. If, however, the HSPA TTI starts at subframe 1 of an LTE-A data frame, HSPA transmission may take place in the first HSPA TTI, as well as in the second HSPA TTI.

The shared carrier will have to transmit LTE-A common channels to ensure that mobility and basic synchronization in LTE is maintained. This means that LTE common channels such as the PSS/SSS (primary and secondary synchronization channels), PBCH (physical broadcast channel) and SI (system information) needs to be transmitted when they occur. Therefore, it is not possible to use every subframe of a data frame for HSPA transmission.

However, it can be seen from FIG. 5 that in principle it is possible to carry up to 60% HSPA traffic in an LTE-configured cell. In other words, up to 60% of the LTE capacity in the time domain can be given to the HSPA users in the cell and provide a dynamic balancing of load between the two radio access technologies.

The benefits of the dynamic spectrum sharing provided by the invention include a faster and more flexible adaptation to load, since shared carriers can be active all the time for both radio access technologies. Therefore the UEs 1 and 2 may also stay connected to the shared carrier during a spectrum shift.

Figure 6:
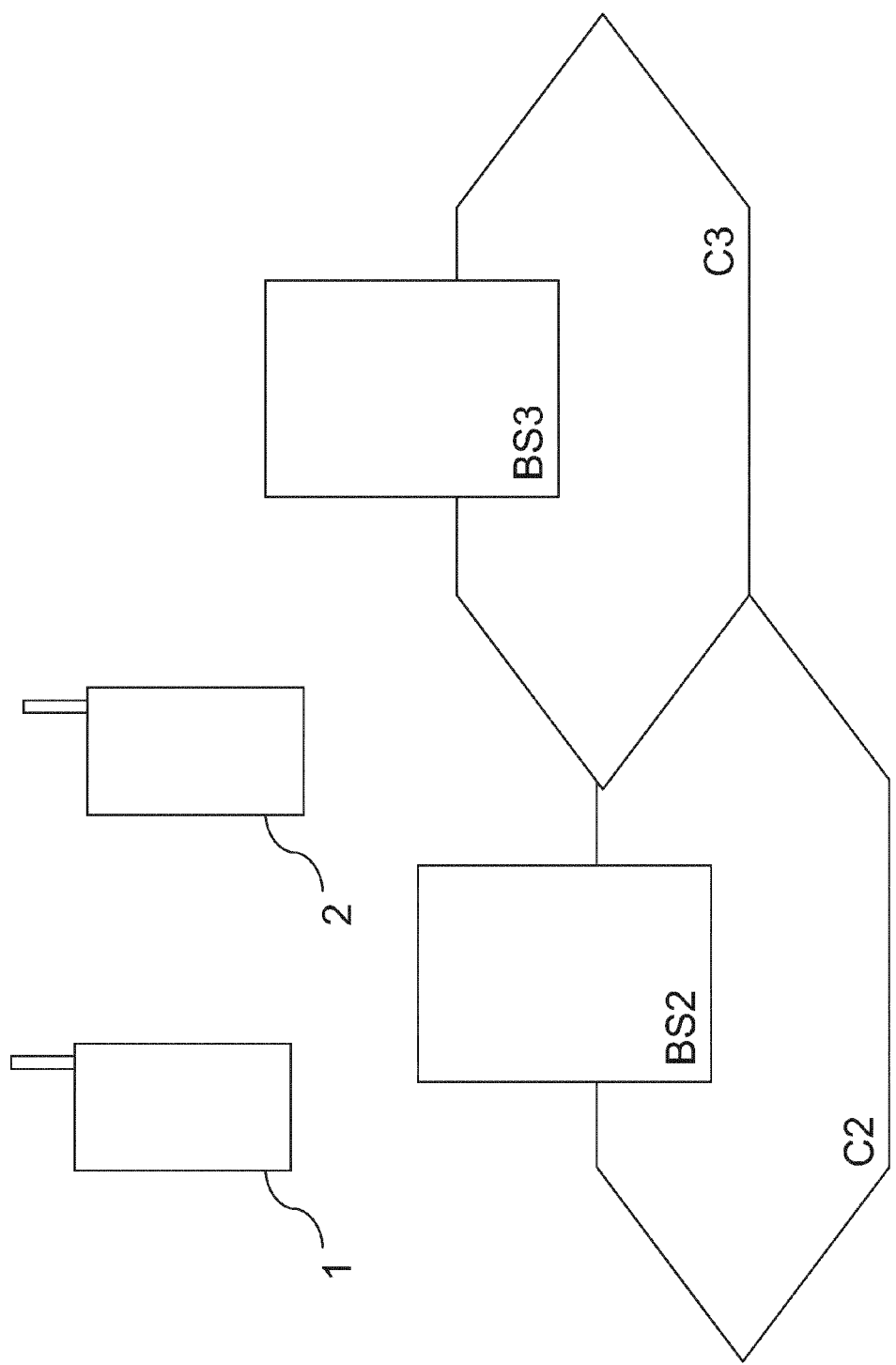
FIG. 6 is a simplified schematic diagram of a wireless communications network.

Another embodiment of the invention is illustrated in FIG. 6. In this embodiment, the UEs 1 and 2 are at the border of two cells C2 and C3 of a wireless communications network, accessible via base stations BS2 and BS3, respectively. The cells C2 and C3 are adjacent and may overlap each other. The UEs 1 and 2 may exchange data with both base stations BS2 and BS3 using HSPA and/or LTE-A. In this illustrative example, the base station BS2 transmits using HSPA and the base station BS3 transmits using LTE.

Figure 7:
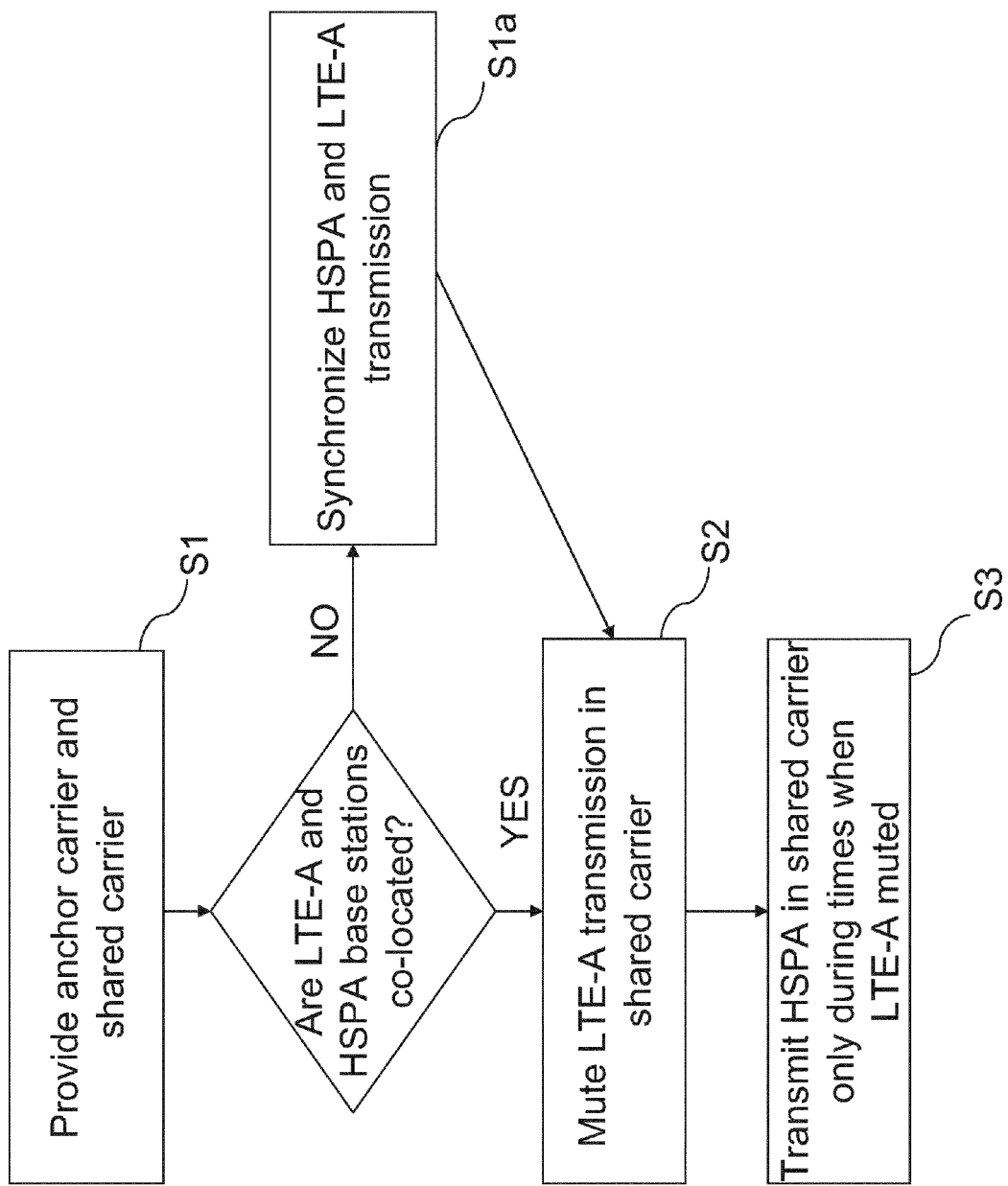
FIG. 7 is a flow chart illustrating a method according to an embodiment of the invention.

The method of transmission according to this embodiment is exactly the same as in the previous embodiment described above and is illustrated in the flow chart in FIG. 7. In step S1 an anchor carrier is provided, which is one 5 MHz band of the 20 MHz spectrum available to the network and is associated only with HSPA transmission, as well as one or more shared carriers shared between HSPA and LTE-A. In step S2, LTE-A transmission is muted in the shared carrier(s) (in this embodiment transmission from the base station BS3 is muted) during one or more subframes of an LTE-A dataframe. Then in step S3 data is transmitted using HSPA in the shared carrier (in this embodiment from the base station BS2) only during the subframe(s) in which LTE-A transmission in muted. However, in this example the two network nodes (base stations BS2 and BS3) used for transmission of HSPA and LTE-A are not co-located and mechanisms for ensuring time-synchronization and coordination of the LTE-A muting patterns shown in FIG. 5 are required. Therefore an additional step S1a takes place after step S1 in this embodiment, whereby transmission to the UEs 1 and 2 of data frames via HSPA from the base station BS2 is synchronized with transmission of data frames via LTE-A from the base station BS1. The start time of transmission of an LTE-A subframe should be the same as the start time of every other HSPA TTI, since an HSPA TTI is 2 ms, whereas an LTE subframe is 1 ms. Any known synchronization mechanism already defined for coordination between e-Node Bs in LTE-A may be used for this purpose.

For the purpose of the present invention as described hereinabove, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and network devices, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

The terms "user equipment (UE)" and "mobile station" described herein may refer to any mobile or stationary device including a mobile telephone, a computer, a mobile broadband adapter, a USB stick for enabling a device to access to a mobile network, etc.

The exemplary embodiments of the invention have been described above with reference to a communications network supporting HSPA and LTE-A. However, the above-described examples may be applied to any wireless communications network.

Although the invention has been described hereinabove with reference to specific embodiments, it is not limited to these embodiments and no doubt further alternatives will occur to the skilled person that lie within the scope of the invention as claimed.

For example the invention does not have to apply to HSPA and LTE-A technologies. The first radio access technology does not have to be code division multiplexed and continuously transmitted so that the invention may also be applied to WiMAX and LTE technologies, for example.

LIST OF ABBREVIATIONS

3GPP 3rd generation partnership project
eICIC Enhanced inter-cell interference coordination
LTE Long term evolution
LTE-Advanced Long term evolution-Advanced
MIB Master Information block
CSG Closed subscriber group
PBCH Physical broadcast channel
TDM Time-domain mux
UE User equipment
eNB evolved Node B (base station for LTE)
eICIC Enhanced inter-cell interference coordination SI System information
PSS Primary Synchronization channel
SSS Secondary Synchronization channel
DSR Dynamic Spectrum Refarming

The invention claimed is:

1. A method comprising:
providing an anchor carrier associated only with a first radio access technology for providing continuous transmission via the first radio access technology and another carrier shared between the first radio access technology and a second radio access technology;
muting transmission via the second radio access technology in the shared carrier during at least one subframe of each data frame transmitted using the second radio access technology; and
transmitting data using the first radio access technology based on code division multiplexing in the shared carrier only during the at least one subframe in which transmission using the second radio access technology is muted,
wherein data transmitted using the code division multiplexed transmission to a user associated with the first radio technology is split into a first part having an additional time-multiplex structure and a second part having continuous transmission such that the first part contains only packet user data channels and packet user data associated signalling channels and is transmitted on the shared carrier and the second part contains all dedicated channels associated with the packet user data channels, radio access related channels, broadcast and synchronization channels and is transmitted only on the anchor carrier.

2. The method according to claim 1, wherein data frames are transmitted from a first cell of a communications network using the first radio access technology and from a second cell of the communications network using the second radio access technology.

3. The method according to claim 2, wherein the second cell is adjacent to the first cell.

4. The method according to claim 2, wherein the second cell at least partially overlaps the first cell.

5. The method according to claim 2, further comprising synchronizing transmission of data frames transmitted via the first radio technology with transmission of data frames transmitted via the second radio access technology such that a start time of transmission of a subframe of a data frame transmitted via the first radio access technology is the same as a start time of transmission of every other subframe of a data frame transmitted via the second radio access technology.

6. The method according to claim 1, wherein a first subframe of a data frame transmitted via the first radio access technology is synchronized with a first subframe of a data frame transmitted via the second radio access technology and transmission via the first radio access technology takes place during a second subframe of the data frame transmitted via the first radio access technology.

7. The method according to claim 1, wherein a first subframe of a data frame transmitted via the first radio access technology is synchronized with a second subframe of a data frame transmitted via the second radio access technology and transmission via the first radio access technology takes place during the first subframe of the data frame transmitted via the first radio access technology.

8. The method according to claim 1, wherein a pilot signal is transmitted using the first radio access technology in the anchor carrier.

9. An apparatus for a communications network, comprising
a processor; and
a non-transitory memory including computer program code,
the memory and the computer program code are configured to, with the processor, cause the apparatus to:
provide an anchor carrier associated only with a first radio access technology and another carrier shared between the first radio access technology and a second radio access technology, wherein the anchor carrier is configured to provide continuous transmission via the first radio access technology;
mute transmission via the second radio technology in the shared carrier during at least one subframe of each data frame transmitted using the second radio access technology; and
transmit data using the first radio access technology based on code division multiplexing in the shared carrier only during the at least one subframe in which transmission using the second radio access technology is muted, and
wherein data transmitted using the code division multiplexed transmission to a user associated with the first radio technology is split into a first part having an additional time-multiplex structure and a second part having continuous transmission such that the first part contains only packet user data channels and packet user data associated signalling channels and is transmitted on the shared carrier and the second part contains all dedicated channels associated with the packet user data channels, radio access related channels, broadcast and synchronization channels and is transmitted only on the anchor carrier.

10. A computer program product comprising a non-transitory computer readable medium having a program comprising software portions embodied thereon, the software portion executable by a processor, to cause a device to perform at least:
providing an anchor carrier associated only with a first radio access technology for providing continuous transmission via the first radio access technology and another carrier shared between the first radio access technology and a second radio access technology;
muting transmission via the second radio access technology in the shared carrier during at least one subframe of each data frame transmitted using the second radio access technology; and
transmitting data using the first radio access technology based on code division multiplexing in the shared carrier only during the at least one subframe in which transmission using the second radio access technology is muted,
wherein the data transmitted using code division multiplexed transmission to a user associated with the first radio technology is split into a first part having an additional time-multiplex structure and a second part having continuous transmission such that the first part contains only packet user data channels and packet user data associated signalling channels and is transmitted on the shared carrier and the second part contains all dedicated channels associated with the packet user data channels, radio access related channels, broadcast and synchronization channels and is transmitted only on the anchor carrier.

11. The method according to claim 1, wherein the first radio access technology is High Speed Packet Access.

12. The method according to claim 1, wherein the second radio access technology is Long Term Evolution or Long Term Evolution Advanced.

13. The apparatus according to claim 9, wherein the processor is further arranged to cause the apparatus to: transmit data frames from a first cell of a communications network using the first radio access technology and from a second cell of the communications network using the second radio access technology.

14. The apparatus according to claim 13, wherein the processor is further arranged to cause the apparatus to: synchronize transmission of data frames transmitted via the first radio technology with transmission of data frames transmitted via the second radio access technology such that a start time of transmission of a subframe of a data frame transmitted via the first radio access technology is the same as a start time of transmission of every other subframe of a data frame transmitted via the second radio access technology.

15. The apparatus according to claim 9, wherein the processor is further arranged to cause the apparatus to: synchronize a first subframe of a data frame transmitted via the first radio access technology with a first subframe of a data frame transmitted via the second radio access technology and transmission via the first radio access technology takes place during a second subframe of the data frame transmitted via the first radio access technology.

16. The apparatus according to claim 9, wherein the processor is further arranged to cause the apparatus to: synchronize a first subframe of a data frame transmitted via the first radio access technology with a second subframe of a data frame transmitted via the second radio access technology and transmission via the first radio access technology takes place during the first subframe of the data frame transmitted via the first radio access technology.

17. The apparatus according to claim 9, wherein the processor is further arranged to cause the apparatus to: transmit a pilot signal using the first radio access technology in the anchor carrier.

18. The apparatus according to claim 9, wherein the first radio access technology is High Speed Packet Access.

19. The apparatus according to claim 9, wherein the apparatus comprises a base station.

* * * * *